United States Patent
Naitou

(10) Patent No.: US 9,327,408 B2
(45) Date of Patent: May 3, 2016

(54) ROBOT CONTROL DEVICE DETECTING CONTACT WITH EXTERNAL ENVIRONMENT

(71) Applicant: FANUC Corporation, Yamanashi (JP)

(72) Inventor: Yasuhiro Naitou, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 14/616,992

(22) Filed: Feb. 9, 2015

(65) Prior Publication Data
US 2015/0258690 A1 Sep. 17, 2015

(30) Foreign Application Priority Data

Mar. 12, 2014 (JP) ................................. 2014-048971

(51) Int. Cl.
| | | |
|---|---|---|
| G05B 19/18 | (2006.01) | |
| B25J 13/08 | (2006.01) | |
| G01L 5/00 | (2006.01) | |
| B25J 19/06 | (2006.01) | |
| B25J 9/16 | (2006.01) | |

(52) U.S. Cl.
CPC ............. *B25J 13/085* (2013.01); *B25J 9/1633* (2013.01); *B25J 19/06* (2013.01); *G01L 5/0052* (2013.01); *G05B 2219/39319* (2013.01); *Y10S 901/46* (2013.01)

(58) Field of Classification Search
CPC .......... B25J 13/085; B25J 9/1633; B25J 9/06; G10L 5/0052; G05B 2219/39319
USPC ........................................................ 700/253
See application file for complete search history.

(56) References Cited

U.S. PATENT DOCUMENTS

| | | | | |
|---|---|---|---|---|
| 5,260,629 A | * | 11/1993 | Ioi .......................... | B25J 9/1615 318/567 |
| 5,497,061 A | * | 3/1996 | Nonaka ................... | B25J 9/1633 318/568.1 |
| 5,920,679 A | * | 7/1999 | Ge ......................... | B25J 9/1664 318/568.15 |
| 6,921,317 B2 | * | 7/2005 | Wood ...................... | B24B 19/06 451/1 |
| 2015/0019103 A1 | * | 1/2015 | Choi ....................... | B60T 8/172 701/82 |

FOREIGN PATENT DOCUMENTS

| | | |
|---|---|---|
| JP | 4-148307 A | 5/1992 |
| JP | 8-257975 A | 10/1996 |
| JP | 2001-51721 A | 2/2001 |
| JP | 2005-125427 A | 5/2005 |
| JP | 2006-021287 A | 1/2006 |
| JP | 2008-269316 A | 11/2008 |
| JP | 2009-23047 A | 2/2009 |
| JP | 2012-139769 A | 7/2012 |
| JP | 2013-521489 A | 6/2013 |
| WO | 2009/057229 A1 | 5/2009 |

* cited by examiner

*Primary Examiner* — Ian Jen
(74) *Attorney, Agent, or Firm* — Hauptman Ham, LLP

(57) ABSTRACT

A robot control device includes: an internal force estimating unit; a storage unit in which, in each small region of a rotational operation region of a plurality of joints of a robot arm, an internal force estimated by the internal force estimating unit is subtracted from an output of the force sensor in a state in which the robot arm is not in contact with an external environment, thereby storing a force correction amount; a force correction amount determining unit in which a force correction amount corresponding to each of the current angles of the plurality of joints of the robot arm is determined; and a contact force calculating unit in which a contact force when the robot arm is in contact with an external environment is calculated by subtracting an internal force and the force correction amount from a current output of the force sensor.

2 Claims, 3 Drawing Sheets

| JOINT ANGLE OF ROBOT ARM | | | | | | FORCE CORRECTION AMOUNT | | |
|---|---|---|---|---|---|---|---|---|
| J1 | J2 | J3 | J4 | J5 | J6 | $\Delta FX$ | $\Delta FY$ | $\Delta FZ$ |
| $J1_1$ | $J2_1$ | $J3_1$ | $J4_1$ | $J5_1$ | $J6_1$ | $\Delta FX_{11}$ | $\Delta FY_{11}$ | $\Delta FZ_{11}$ |
| $J1_2$ | $J2_1$ | $J3_1$ | $J4_1$ | $J5_1$ | $J6_1$ | $\Delta FX_{21}$ | $\Delta FY_{21}$ | $\Delta FZ_{21}$ |
| $J1_3$ | $J2_1$ | $J3_1$ | $J4_1$ | $J5_1$ | $J6_1$ | $\Delta FX_{31}$ | $\Delta FY_{31}$ | $\Delta FZ_{31}$ |
| ⋮ | ⋮ | ⋮ | ⋮ | ⋮ | ⋮ | ⋮ | ⋮ | ⋮ |
| $J1_n$ | $J2_1$ | $J3_1$ | $J4_1$ | $J5_1$ | $J6_1$ | $\Delta FX_{n1}$ | $\Delta FY_{n1}$ | $\Delta FZ_{n1}$ |

ROBOT CONTROL DEVICE DETECTING CONTACT WITH EXTERNAL ENVIRONMENT

RELATED APPLICATIONS

The present application claims priority to Japanese Application Number 2014-048971, filed Mar. 12, 2014, the disclosure of which is hereby incorporated by reference herein in its entirety.

BACKGROUND OF THE INVENTION

1. Technical Field

The present invention relates to a control device, which is particularly for an industrial robot, detecting a contact with an external environment.

2. Description of Related Art

A robot arm is provided with a force sensor to detect an external force applied to the robot arm. Japanese Laid-open Patent Publication No. 2006-21287 estimates an internal force acting on a force sensor when a robot arm operates without being in contact with an external environment. When a robot arm is in contact with an external environment, a contact force is determined as a variation obtained by subtracting an estimated value of the internal force from the output of the force sensor. Whether the robot arm is in contact with an external environment or not is determined based on the variation. When the robot arm is in contact with an external environment, the robot arm is made to avoid being in contact with the external environment or to stop, thereby to ensure safe operation of the robot safely.

Incidentally, FIG. 4A is a drawing illustrating relationship between a robot in one attitude and a umbilical member. As illustrated in FIG. 4A, umbilical members 109 suspended from a ceiling are attached at a plurality of points on a robot arm 101 of a robot 1 by a fixing tool 108. In some cases, as illustrated in FIG. 4B, the robot arm 101 operates in such a manner to change its attitude.

When the robot arm 101 operates in such a manner to change its attitude, a force due to pulling of the umbilical member 109 attached to the robot arm 101 or the like is generated. A force sensor 103 attached at a lower portion of the robot 1 detects such a force caused by pulling of the umbilical member 109. Since, usually, the umbilical member 109 is attached depending on the details of a robot system, the type and the number of the umbilical members 109 vary for each robot system. For this reason, unlike an internal force which can be estimated by the configuration of the robot arm 101, a force caused by pulling of the umbilical member 109 cannot be estimated beforehand.

Therefore, whether a robot arm is in contact with an external environment or not cannot be precisely determined since a force caused by pulling of the umbilical member 109 cannot be included in the internal force to be estimated. For this reason, in some cases, even when the robot arm 101 is not in contact with an external environment, it is determined that the robot arm 101 is in contact with an external environment; alternatively, even when the robot arm 101 is in contact with an external environment, it is determined that the robot arm 101 is not in contact with an external environment.

Therefore, a force caused by pulling of the umbilical member 109 needs to be corrected, and the following method is thus considered. First, a real space is divided into a plurality of small regions, and then, for each of the divided small regions, the above-mentioned force when the tip of the robot arm 101 is included in the small region is measured to be stored as a force correction amount. Then, an estimated value of an internal force and a force correction amount corresponding to a region including the current position of the tip of the robot arm 101 are subtracted from an output of a force sensor to determine a deviation as a contact force.

However, if the attitude of the robot arm 101 is changed even when the position of the tip of the robot arm 101 is in the same region, the force correction amount may be inappropriate. For example, the positions of the tip of the robot arm 101 in FIG. 4A and FIG. 4B are the same. However, the angles of each joint of the robot in FIG. 4A and FIG. 4B are different from each other, and thus the attitudes of the robot are different from each other in FIG. 4A and FIG. 4B.

Therefore, in FIG. 4A and FIG. 4B, the magnitudes and the directions of forces of the robot arm 101 for pulling the umbilical member are different from each other. In such a case, the difference in the magnitude and the direction of the above-mentioned force cannot be corrected even when a force correction amount is determined depending on only the position of the tip of the robot arm 101.

The present invention has been made under such circumstances, and an object of the present invention is to provide a robot control device which can highly precisely detect a contact with an external environment without, even in cases in which a force is generated when a umbilical member attached to a robot arm or the like is pulled, being affected by such a force.

SUMMARY OF INVENTION

In order to attain the above-mentioned object, according to a first aspect, provided is a robot control device for controlling an articulated robot to which a force sensor is attached, comprising: an internal force estimating unit for estimating a force generated at a point where the force sensor is attached as an internal force, based on the weight of each of a robot arm and a hand attached to the tip of the robot arm in a state in which the robot arm of the robot is not in contact with an external environment, and an inertial force generated by the operation of each of the robot arm and the hand; a storage unit in which each rotational operation region of a plurality of joints of the robot arm is divided into a plurality of small regions depending on the angle, and for each of the small regions, an internal force estimated by the internal force estimating unit is subtracted from an output of the force sensor in a state in which the robot arm is not in contact with an external environment, thereby storing a force correction amount; a force correction amount determining unit in which a force correction amount corresponding to each of the current angles of the plurality of joints of the robot arm is determined by the storage unit; and a contact force calculating unit in which a contact force when the robot arm is in contact with an external environment is calculated by subtracting an internal force estimated by the internal force estimating unit and the force correction amount determined by the force correction amount determining unit from a current output of the force sensor.

According to a second aspect, in the first aspect, the robot control device further comprises a stop command unit for stopping the robot arm when the contact force calculated by the contact force calculating unit is larger than a predetermined value.

These objects, features, and advantages of the present invention and other objects, features, and advantages thereof will be made clearer from the detailed description of a typical embodiment of the present invention shown in the accompanying drawings.

DETAILED DESCRIPTION

Figure 1:
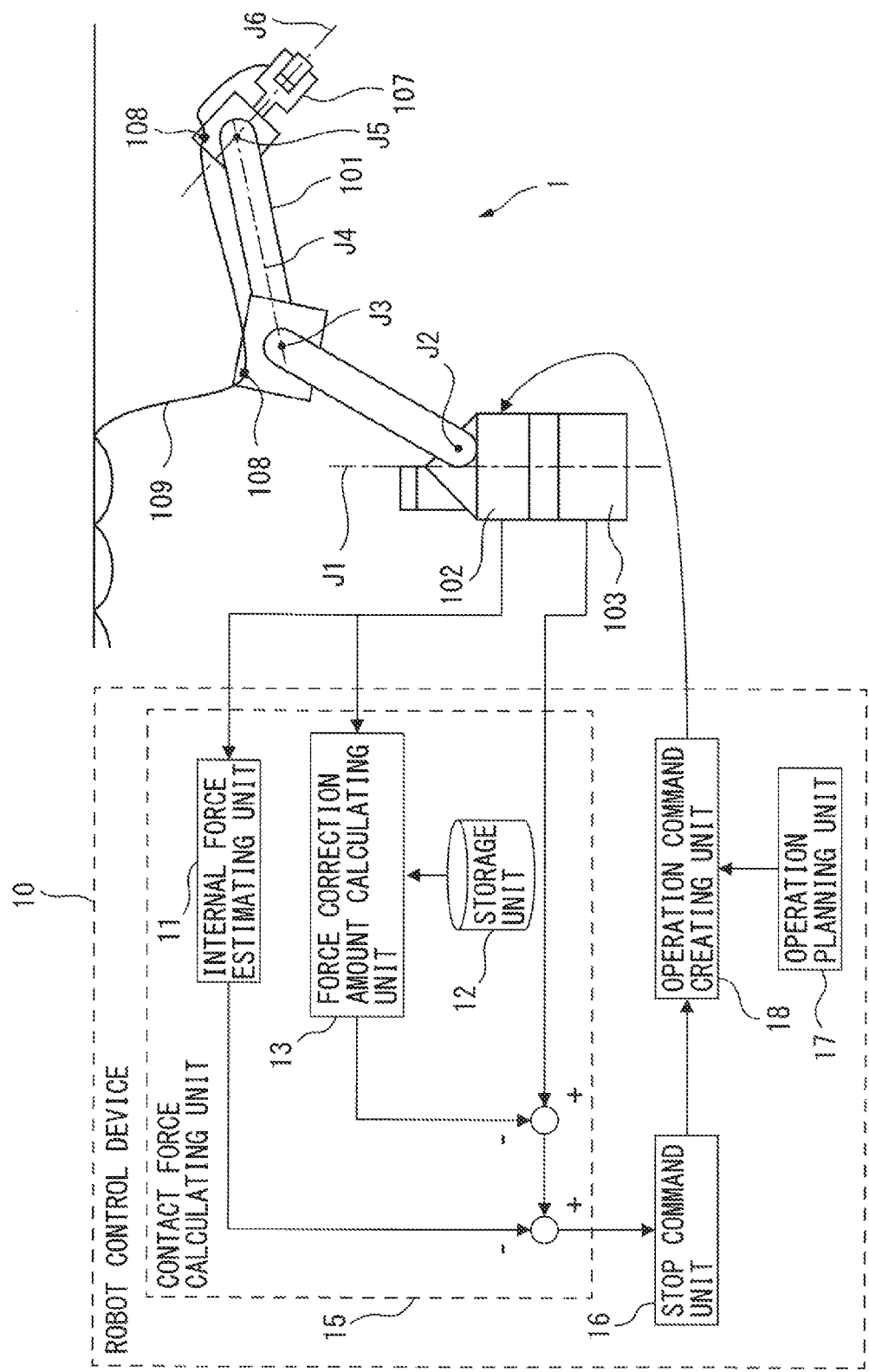
FIG. 1 is a function block diagram of a robot control device based on the present invention.

Embodiments of the present invention will now be described with reference to accompanying drawings. Throughout the drawings below, the same reference numerals are used to refer to the same elements. For easier understanding, the drawings are provided in different scales as needed.

FIG. 1 is a function block diagram of a robot control device based on the present invention. As illustrated in FIG. 1, the robot 1 comprising a plurality of joints such as a 6-axis vertically articulated robot is connected to a robot control device 10. The robot arm 101 of the robot 1 is provided with six joints, and each of joints J1 to J6 of the robot arm 101 can perform a rotation or twist operation.

Although not illustrated, each of the joints J1 to J6 is provided with a motor, a reduction gear, a rotation angle detector, and the like, and the rotation angle of each of the joints J1 to J6 is controlled by a command from the robot control device 10. The tip of the robot arm 101 is provided with a hand 107, which holds a workpiece.

As illustrated in FIG. 1, the umbilical member 109 suspended from a ceiling extends to the hand 107 of the robot 1. The umbilical member 109 is fixed at a plurality of points of the robot arm 101 by the fixing tool 108. In order to drive the hand 107, the umbilical member 109 comprises: a cable for supplying a driving force or a signal; and/or a tube for supplying a cooling water or air for driving. In place of the hand 107, a welding torch or the like may be attached to the tip of the robot arm 101.

A robot base 102 is provided at a bottom unit of the robot arm 101. Further, a force sensor 103 is provided at a lower portion of the robot base 102. The force sensor 103 can detect three components of a force in the X direction, the Y direction, and the Z direction. When a force applied to the robot arm 101 which is arranged above the robot base 102 has been changed, an output of the force sensor 103 changes.

In this connection, a force applied to the robot arm 101 includes: a contact force which is applied to the robot arm 101 when the robot arm 101 is in contact with an external environment; a force (hereinafter referred to as "internal force") which is generated by an operation of the robot arm 101 itself; and a force which is generated due to pulling of the umbilical member 109 when the robot arm 101 operates to change its attitude.

The force sensor 103 may be embedded in the robot arm 101. In such a case, the contact force, which is among forces applied to the robot arm 101, means a force which is applied to a portion from the point where the force sensor 103 is embedded to the tip of the robot arm 101 when being in contact with an external environment.

The robot control device 10 is a digital computer, which controls the operation of the robot 1. As illustrated in FIG. 1, the robot control device 10 comprises: an operation planning unit 17 containing an operation program of the robot 1 or the like; and an operation command creating unit 18 which creates an operation command of the robot 1 based on the operation planning unit 17.

Figures 2, 3:
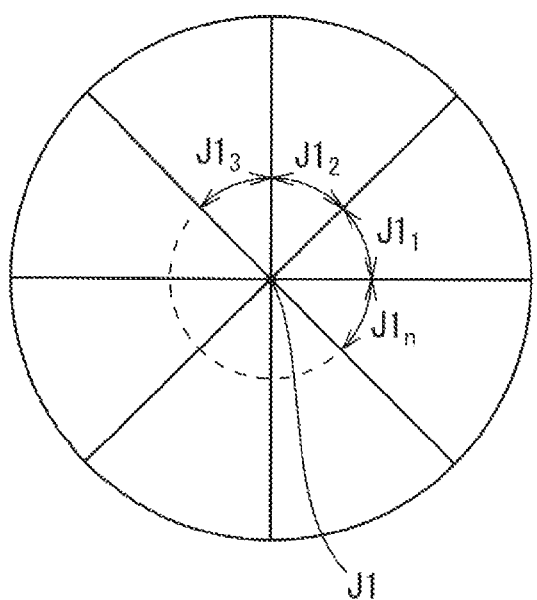
FIG. 2 is a drawing illustrating one example of a force correction amount table stored in a storage unit.
FIG. 3 is a drawing illustrating a rotational operation region of one joint.
Figure 4A:
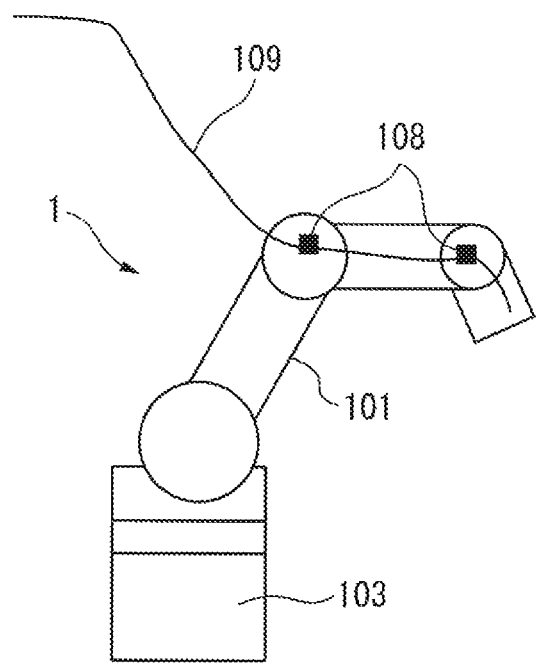
FIG. 4A is a drawing illustrating a relationship between a robot in one attitude and an umbilical member.
Figure 4B:
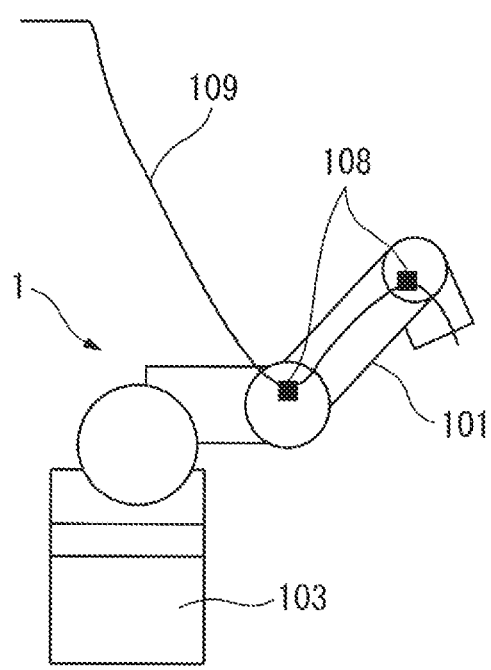
FIG. 4B is a drawing similar to FIG. 4A in another attitude.

Further, the robot control device 10 comprises a contact force calculating unit 15 which calculates, for each predetermined control period of the robot 1, a contact force when the robot arm 101 is in contact with an external environment. As illustrated in FIG. 2, the contact force calculating unit 15 comprises: an internal force estimating unit 11 which estimates the above-mentioned internal force; a storage unit 12 which stores a force correction amount table; and a force correction amount determining unit 13 which determines a force correction amount based on the force correction amount table.

The internal force estimating unit 11 estimates by a known method a force applied to a point where the force sensor 103 is attached due to the weight of each of the robot arm 101 and hand 107 and an inertial force caused by the operation thereof when the robot arm 101 is not in contact with an external environment. When estimating an internal force, the internal force estimating unit 11 appropriately utilizes a rotation angle of a motor which has been detected by a rotation angle detector, a rotation angle command value of the motor in the operation planning unit 17, or the like. Internal forces in the X direction, the Y direction, and the Z direction are represented by RFX, RFY, and RFZ, respectively.

FIG. 2 is a drawing illustrating one example of a force correction amount table stored in a storage unit. As illustrated in FIG. 2, in the force correction amount table, regarding one joint among a plurality of joints J1 to J6 of the robot arm 101, such as the joint J1, a rotational operation region of the joint J1 is divided into small regions J11 to J1n, whose number is "n".

FIG. 3 is a drawing illustrating a rotational operation region of one joint. The center illustrated in FIG. 3 represents the center axis of a joint such as the joint J1. The rotational operation region of the joint J1 is 360°. In FIG. 3, the rotational operation region is divided into "n" small regions J11 to J1n at a regular interval depending on the angle about the joint J1. Although not illustrated in the figure, "n" small regions are similarly set for each of the other joints J2 to J6.

Referring to FIG. 2 again, while fixing joints J2 to J6 in respective first small regions J21 to J61, the joint J1 is allocated in small regions J11 to J1n. In FIG. 2, for each combination of any of the small regions J11 to J1n of the joint J1 and the first small regions J21 to J61 of the joints J2 to J6, a force correction amount is set. As shown in FIG. 2, force correction amounts ΔFX, ΔFY, and ΔFZ are set for the X direction, the Y direction, and the Z direction.

The force correction amount is obtained by subtracting an internal force estimated by the internal force estimating unit 11 from an output of the force sensor 103 in a state in which the robot arm 101 is not in contact with an external environment. Specifically, the robot 1 is operated to have an attitude in which the joints J1 to J6 of the robot 1 are within the small regions illustrated in FIG. 2. In such a case, the robot arm 101 does not have to be in contact with an external environment.

When the robot is in such an attitude, outputs SFX, SFY, and SFZ of the force sensor 103 in the X direction, the Y direction, and the Z direction are read. Then, as represented by the following formulae (1) to (3), force correction amounts ΔFX, ΔFY, and ΔFZ are calculated by subtracting internal forces RFX, RFY, and RFZ estimated by the internal force estimating unit 11 from the outputs SFX, SFY, and SFZ of the force sensor 103, respectively.

$$\Delta FX = SFX - RFX \quad (1)$$

$$\Delta FY = SFY - RFY \quad (2)$$

$$\Delta FZ = SFZ - RFZ \quad (3)$$

The thus calculated force correction amounts correct a force generated caused by pulling of the umbilical member 109 attached to the robot arm 101 when the attitude of the robot arm 101 changes.

In the force correction amount table illustrated in FIG. 2, while the joints J2 to J6 are fixed in the first small regions J21 to J61, the joint J1 is allocated in the small regions J1$_1$ to J1$_n$. Then, in a state in which the joints J2 to J6 are fixed to second small regions J22 to J62, the force correction amount is similarly determined. By repeating such an operation, a force correction amount table is created such that all combinations for small regions of the joints J1 to J2 are included (see the following formula (4)). The force correction amounts may be calculated by a common interpolation method.

$$\begin{pmatrix} [J1_1 - J1_n] \\ [J2_1 - J2_n] \\ [J3_1 - J3_n] \\ [J4_1 - J4_n] \\ [J5_1 - J5_n] \\ [J6_1 - J6_n] \end{pmatrix} \rightarrow (\Delta FX_m, \Delta FY_m, \Delta FZ_m) \quad (4)$$

The rotational operation region is not necessarily divided at a regular interval. For example, while a small region may be set at a regular interval per a small angle in a region of the rotational operation region where a change in the force correction amount is large, a small region may be set at a regular interval per a large angle in a region of the rotational operation region where a change in the force correction amount is small. In such a case, the storage capacity of the storage unit 12 can be minimized while maintaining the below-mentioned effect of correction.

An element which has a small influence on a force correction amount may be excluded from the force correction amount table in FIG. 2. For example, when it is obvious that the attitudes of the joints J4 to J6 have small influence on the force correction amount, settings of the small regions of the joints J4 to J6 may be excluded. Also in such cases, the storage capacity of the storage unit 12 can be minimized while maintaining the effect of correction.

The force correction amount determining unit 13 determines force correction amounts $\Delta FX$, $\Delta FY$, and $\Delta FZ$ for each predetermined control period when the robot 1 operates. Specifically, the force correction amount determining unit 13 acquires angles about the joints J1 to J6 detected by a rotation angle detector, and determines force correction amounts $\Delta FX$, $\Delta FY$, and $\Delta FZ$ corresponding to the angles using the force correction amount table of the storage unit 12.

As shown in FIG. 1, the contact force calculating unit 15 calculates contact forces CFX, CFY, and CFZ by subtracting force correction amounts $\Delta FX$, $\Delta FY$, and $\Delta FZ$, and internal forces RFX, RFY, and RFZ from outputs SFX, SFY, and SFZ of the force sensor 103.

$$CFX = SFX - \Delta FX - RFX \quad (5)$$

$$CFY = SFY - \Delta FY - RFY \quad (6)$$

$$CFZ = SFZ - \Delta FZ - RFZ \quad (7)$$

A stop command unit 16 of the robot control device 10 compares the magnitude of the contact forces CFX, CFY, and CFZ with a reference value, and when the magnitude of the contact force is larger than the reference value, a stop command for the robot 1 is created to be supplied to the operation command creating unit 18. The operation command creating unit 18 supplies the stop command to the robot 1 to stop the robot 1.

The stop command unit 16 may create a stop command for a whole robot when all of the contact forces CFX, CFY, and CFZ are larger than a reference value; while the stop command unit 16 may create a stop command for a whole robot when at least one of the contact forces CFX, CFY, and CFZ is larger than a reference value. Alternatively, when at least one contact force, for example, a contact force CFX is larger than a reference value, the stop command unit 16 can create a stop command only for the direction thereof. Different reference values may be adopted for X direction, Y direction, and Z direction. A stop command may be created when the magnitude of a force composed of the contact forces of these directions is larger than a reference value.

In cases in which the robot arm 101 is not in contact with an external environment when the robot 1 operates, a force correction amount and an internal force are subtracted from an output of the force sensor 103 to obtain a contact force which is zero. Therefore, the contact force is not larger than the reference value, and thus, the operation command creating unit 18 continues supplying an operation command to the robot 1 based on the operation planning unit 17.

In contrast, in cases in which the robot arm 101 is in contact with an external environment such as a peripheral or a worker, a force correction amount and an internal force are subtracted from an output of the force sensor 103 to obtain a contact force which is not zero. When the magnitude of the contact force is larger than the reference value, a stop command is output from the stop command unit 16, thereby stopping the robot 1. In this way, the robot 1 can be operated safely.

As mentioned above, in the present invention, a contact force is calculated by subtracting an internal force estimated by the internal force estimating unit 11 and a force correction amount determined by the force correction amount determining unit 13 from a current output of the force sensor 103. A force correction amount is determined beforehand by subtracting an internal force from an output of the force sensor 103 in a state in which the robot arm 101 is not in contact with an external environment. The force correction amount is set for each combination of the angles of the joints J1 to J6 of the robot 1. For this reason, in the present invention, even in cases in which a force is generated by pulling of the umbilical member 109 attached to the robot arm 101 or the like, a contact with an external environment can be detected with high precision, without being influenced by such a force.

Advantageous Effect of Invention

In the first aspect, a force correction amount is determined by subtracting an internal force estimated by an internal force estimating unit from an output of a force sensor in a state in which a robot arm is not in contact with an external environment. Such a force correction amount corrects a force generated by pulling of an umbilical member attached to a robot arm when the attitude of the robot arm is changed. Accordingly, even when a force is generated by pulling of an umbilical member attached to a robot arm or the like, a contact with an external environment can be detected with high precision, without being influenced by such a force.

In the second aspect, when a contact force at the time when the robot arm is in contact with an external environment is larger than a predetermined value, the robot arm is stopped. As a result, the robot can be operated safely.

While the present invention has been described using the typical embodiments, it will be understood by those skilled in the art that the above-described changes and other various changes, omissions, and additions can be made without departing from the scope of the present invention.

The invention claimed is:

1. A robot control device for controlling an articulated robot to which a force sensor is attached, comprising:
   an internal force estimating unit for estimating a force generated at a point where the force sensor is attached as an internal force, based on the weight of each of a robot arm and a hand attached to the tip of the robot arm in a state in which the robot arm of the robot is not in contact with an external environment, and an inertial force generated by the operation of each of the robot arm and the hand;
   a storage unit in which each rotational operation region of a plurality of joints of the robot arm is divided into a plurality of small regions depending on the angle, and for each of the small regions, an internal force estimated by the internal force estimating unit is subtracted from an output of the force sensor in a state in which the robot arm is not in contact with an external environment, thereby storing a force correction amount;
   a force correction amount determining unit in which a force correction amount corresponding to each of the current angles of the plurality of joints of the robot arm is determined by the storage unit; and
   a contact force calculating unit in which a contact force when the robot arm is in contact with an external environment is calculated by subtracting an internal force estimated by the internal force estimating unit and the force correction amount determined by the force correction amount determining unit from a current output of the force sensor.

2. The robot control device according to claim 1, further comprising a stop command unit for stopping the robot arm when the contact force calculated by the contact force calculating unit is larger than a predetermined value.

* * * * *